(12) United States Patent
Gurr

(10) Patent No.: US 7,535,183 B2
(45) Date of Patent: May 19, 2009

(54) APPARATUS AND METHOD TO PROVIDE A HYBRID LINEAR/SWITCHING CURRENT SOURCE, SUCH AS FOR HIGH-EFFICIENCY, WIDE DIMMING RANGE LIGHT EMITTING DIODE (LED) BACKLIGHTING

(75) Inventor: Walter P. M. Gurr, Seattle, WA (US)

(73) Assignee: Korry Electronics Co., Seattle, WA (US)

( * ) Notice: Subject to any disclaimer, the term of this patent is extended or adjusted under 35 U.S.C. 154(b) by 199 days.

(21) Appl. No.: 11/741,335

(22) Filed: Apr. 27, 2007

(65) Prior Publication Data

US 2008/0265793 A1 Oct. 30, 2008

(51) Int. Cl.
*H05B 41/16* (2006.01)
(52) U.S. Cl. .................. 315/247; 315/225; 315/291
(58) Field of Classification Search ............. 315/209 R, 315/224–226, 246–247, 291, 299, 307–308, 315/360; 345/84, 102, 204; 323/282–283, 323/901
See application file for complete search history.

(56) References Cited

U.S. PATENT DOCUMENTS

| | | | |
|---|---|---|---|
| 5,034,676 | A | 7/1991 | Kinzalow |
| 5,132,553 | A | 7/1992 | Siegel |
| 5,140,175 | A | 8/1992 | Yagi et al. |
| 5,812,012 | A | 9/1998 | Jebens |
| 5,903,138 | A | 5/1999 | Hwang et al. |
| 6,229,289 | B1 | 5/2001 | Piovaccari et al. |
| 7,084,612 | B2 | 8/2006 | Zinn |
| 7,262,582 | B2 * | 8/2007 | Warita et al. ............. 323/222 |
| 2003/0034742 | A1 * | 2/2003 | Chang et al. ............. 315/224 |
| 2005/0040773 | A1 * | 2/2005 | Lebens et al. ............ 315/291 |
| 2005/0064830 | A1 | 3/2005 | Grigore |

(Continued)

FOREIGN PATENT DOCUMENTS

EP 0472318 A3 7/1996

(Continued)

OTHER PUBLICATIONS

Linear Technology, LT3595, "16 Channel Buck Mode LED Driver,"Product Brochure, 16 pages, Aug. 2007.

*Primary Examiner*—Douglas W. Owens
*Assistant Examiner*—Tung X Le
(74) *Attorney, Agent, or Firm*—Seed IP Law Group PLLC

(57) ABSTRACT

A hybrid power supply provides powers to a load, such as a light emitting diode (LED) backlight display, using pulse wave modulation (PWM) enable signal to control activation of a linear power supply and a switching power supply. During an initial part of an active portion of a duty cycle of the PWM enable signal, the linear power supply is activated to supply the load with constant current. During the remainder of the active portion of the duty cycle of the PWM enable signal, the linear power supply is deactivated and the switching power supply is activated to provide current to the load. A bias current and voltage may be provided to the LED during an inactive portion of the duty cycle of the PWM enable signal. The hybrid power supply combines the high efficiency of the switching power supply with smooth dimming control at low luminance of the linear power supply.

26 Claims, 4 Drawing Sheets

U.S. PATENT DOCUMENTS

| | | |
|---|---|---|
| 2005/0127883 A1* | 6/2005 | Hoshino et al. ............. 323/274 |
| 2005/0242792 A1 | 11/2005 | Zinn |
| 2006/0170370 A1 | 8/2006 | De Anna |
| 2006/0214603 A1* | 9/2006 | Oh et al. .................... 315/246 |
| 2006/0239689 A1 | 10/2006 | Ashdown |
| 2006/0250825 A1 | 11/2006 | Grigore |
| 2006/0261754 A1 | 11/2006 | Lee |
| 2007/0290624 A1* | 12/2007 | Bai et al. ................ 315/209 R |

FOREIGN PATENT DOCUMENTS

| | | |
|---|---|---|
| EP | 1689212 A1 | 8/2006 |

* cited by examiner

APPARATUS AND METHOD TO PROVIDE A HYBRID LINEAR/SWITCHING CURRENT SOURCE, SUCH AS FOR HIGH-EFFICIENCY, WIDE DIMMING RANGE LIGHT EMITTING DIODE (LED) BACKLIGHTING

TECHNICAL FIELD

The present disclosure generally relates to a method and apparatus to drive light sources, and in particular but not exclusively, relates to a method and apparatus to dim or otherwise adjust brightness of light sources, such as light emitting diode (LED) loads.

BACKGROUND INFORMATION

There are many applications for displays that use backlighting technology, in which LEDs are typically used to illuminate or otherwise display information. For example in high-end avionics applications, such displays are present on the instrument panel or console of an aircraft for navigation, system monitoring, or other purposes. There are several considerations when driving such displays.

A first consideration is that a wide dimming range is useful for accommodating very different operating conditions for a display. Generally, dimming is the process of adjusting the intensity of light (illumination) from an LED of the display. As understood by a person skilled in the art, the range of dimming extends from the maximum light output of the display to minimum light output when the display is controlled to its lowest powered level. Examples of the different operating conditions include daytime high-altitude flight where sunlight directly strikes the display through the cockpit window (wherein the illumination by the LED therefore needs to be increased for improved visibility), and vision-enhanced or stealth night-time flight using night vision goggles or other equipment (wherein the illumination of the LED needs to be at a low level to maintain stealth while still providing acceptable visibility).

A second consideration is that consistent color over the dimming range, LED temperature, and LED life should be maintained, so as to provide rapid recognition of visual cues. For instance with some type of LED displays, significant and undesirable color shifting will occur if the amplitude of the current supplied to the LEDs is not precisely controlled with respect to the optical output.

A third consideration is efficiency. Some types of LED displays do not operate efficiently, thereby increasing the load on power supplies, increasing temperature of the display, and reducing the life the LED display.

A fourth consideration is luminance stability. Unwanted flicker, flashing, or luminance changes in a pilot's peripheral vision are undesirable visual distractions.

LED displays using existing backlight technology fail to adequately address the above and/or other considerations.

BRIEF SUMMARY

One aspect provides a method to provide power to a load. The method includes: generating a PWM enable signal that has a duty cycle that includes a first portion and a second portion; during an initial part of said first portion, supplying current to said load from a linear power supply to cause said load to generate light; during a remainder part of said first portion that is subsequent to said initial part of said first portion, deactivating said linear power supply and supplying current to said load from a switching power supply to cause said load to continue to generate light; and deactivating said switching power supply during said second portion of said duty cycle.

Another aspect provides an apparatus to provide power to a load, the apparatus includes: a pulse wave modulation (PWM) subsystem to generate a PWM enable signal that has a duty cycle that includes a first portion and a second portion; a first control unit coupled to said PWM subsystem to control a linear power supply to supply current to said load to cause said load to generate light during an initial part of said first portion; and a second control unit coupled to said PWM subsystem to control a switching power supply to supply current to said load to cause said load to continue to generate light during a remainder part of said first portion that is subsequent to said initial part of said first portion, said first control unit being adapted to deactivate said linear power supply during said remainder part of said first portion, said second control unit being adapted to deactivate said switching power supply during said second portion of said duty cycle.

Yet another aspect provides a system. The system includes: a backlight light emitting diode (LED) display device; a linear power supply coupled to said LED display device; a switching power supply coupled to said LED display device; a pulse wave modulation (PWM) subsystem to generate a PWM enable signal that has a duty cycle that includes an ON portion and an OFF portion; a first control unit coupled to said PWM subsystem to control said linear power supply to supply current to said LED display device during an initial part of said ON portion of the duty cycle; and a second control unit coupled to said PWM subsystem to control said switching power supply to supply current to said LED display device during a remainder part of said ON portion that is subsequent to said initial part of said ON portion, said first control unit being adapted to deactivate said linear power supply during said remainder part of said ON portion, said second control unit being adapted to deactivate said switching power supply during said OFF portion of said duty cycle.

A further aspect provides a method to provide power to loads. The method includes: producing a drive signal indicative of an amplitude; scaling down the drive signal to produce a scaled down drive signal; applying the scaled down drive signal to a linear power supply error circuit at a first time; producing a linear power supply error signal indicative of a difference between the scaled down drive signal and a current feedback signal indicative of a magnitude of a current being supplied to a load; applying the linear power supply error signal to drive a linear power supply to supply current to the load; applying the drive signal to a switching power supply error circuit at a second time, the second time delayed from the first time; producing a switching power supply error signal indicative of a difference between the drive signal and the current feed back signal indicative of the magnitude of the current being supplied to the load; and applying the switching power supply error signal to drive a switching power supply to supply current to the load.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
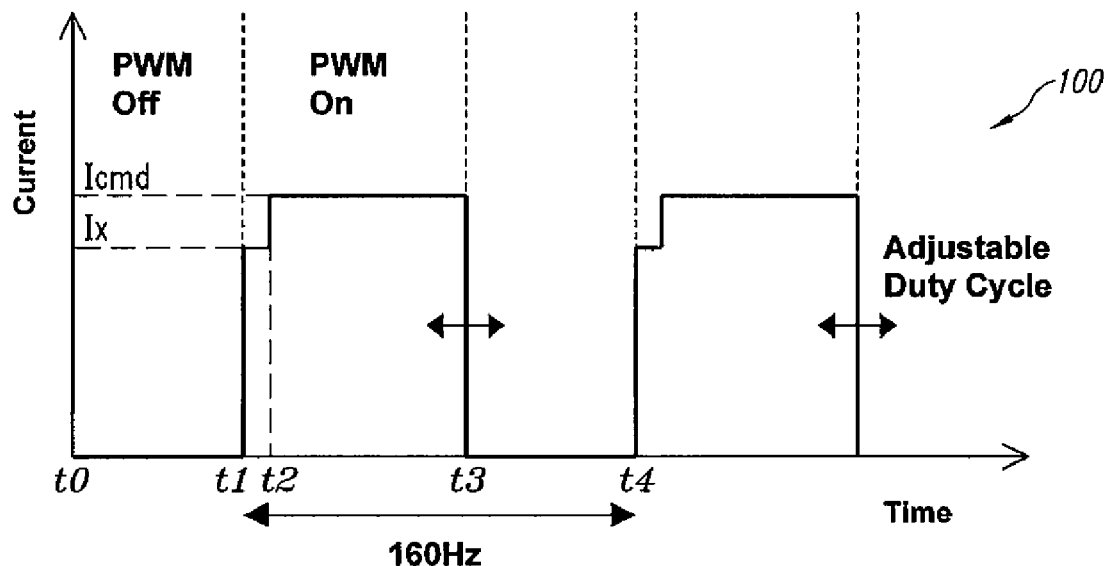
FIG. 1A is a graph showing an output current supplied to a load in response to a pulse width modulation (PWM) enable signal according to one illustrated embodiment.

In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

As an overview, one embodiment combines the desirable qualities of both switching and linear power supplies for a backlighting display that uses multiple different discrete color LEDs, for example. The embodiment uses an efficient switching power supply to provide most of the power, in combination with using a high-speed linear power supply for the start of a pulse wave modulation (PWM) cycle and for narrow duty cycles. Such an embodiment that provides a "hybrid" of both switching and linear power supplies can meet requirements for a wide dimming range with smooth and flicker-free monotonic performance and consistent color.

Switching power supplies in and of themselves are characteristically high in efficiency, yet limited in speed by their switching frequency. A switching power supply can meet efficiency goals, and can further provide accurate current amplitude control and moderately fast rise times. However, switching power supplies lack adequate time step resolution to provide smooth monotonic dimming at low luminance.

In comparison, linear power supplies in and of themselves are characteristically very fast and provide smooth dimming control at low luminance, but have low efficiencies. Efficiency might be in the range of approximately 57%, for example in some applications.

Therefore, one embodiment of the "hybrid" combines the efficiency of switching power supplies with the faster and smooth dimming control at low luminance of linear power supplies. The (low efficiency) linear power supply of one embodiment only operates for a short time, thus reducing its impact on system efficiency and component size. After a delay, the linear power supply is turned OFF and the (more highly efficient) switching power supply of one embodiment turns ON to provide most of the power to the LED(s) of the display.

One embodiment provides a bias current command to a linear power supply error circuit during the OFF portion of the duty cycle. The bias current command causes the linear power supply and control circuit to operate in an active state allowing faster response to drive current changes. The bias voltage of the LED(s) is clamped to a level insufficient to cause illumination in one embodiment by a zener diode in parallel with the LED(s). Said bias voltage also allows fast turn ON response as the bias voltage is just below the operating forward voltage of the LED(s). The zener diode is disabled during the ON portion of the duty cycle. In another embodiment, said bias current and voltage may be omitted from being used at all.

Figure 1B:
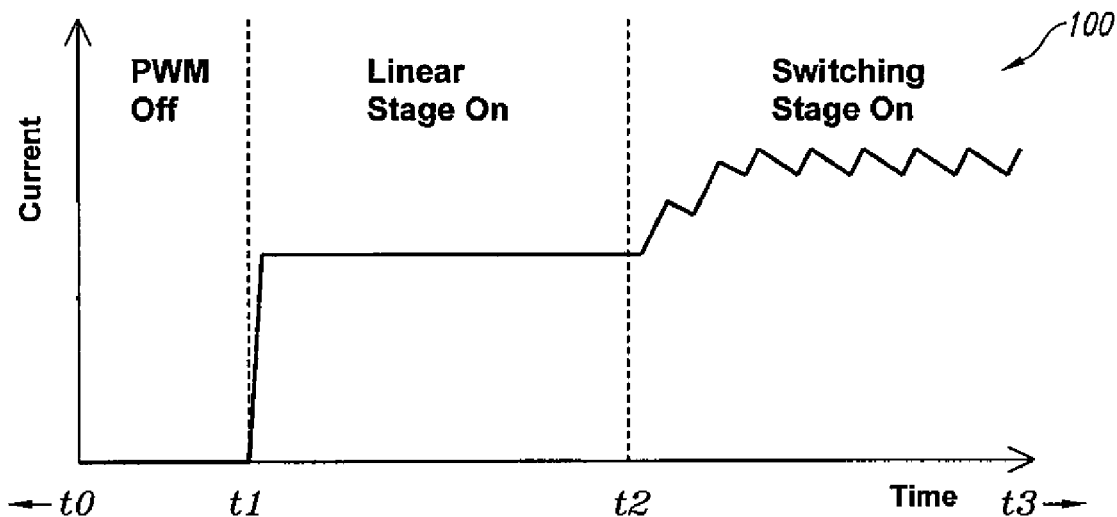
FIG. 1B is a graph showing details of the current supplied to one or more LEDs of the load by linear and switching power supplies according to one illustrated embodiment.

FIGS. 1A-1B provide graphical representations of the operation of a method and apparatus according to various embodiments. As previously explained above, the graphical representations of FIGS. 1A-1B and elsewhere herein are merely for illustrative purposes for ease of explanation and understanding, and not necessarily drawn to scale and are also not intended to precisely depict the shape, amplitude, timing, or other characteristics of the various waveforms.

FIG. 1A depicts an output signal 100 that is provided to a load by the linear and switching power supplies, in response to a PWM enable signal that is used to control activation/deactivation of said power supplies. FIG. 1B is a magnified (more detailed) graphical representation of the output signal 100 of FIG. 1A. In one embodiment, the output signal 100 is a current signal. More detailed descriptions of an embodiment of the output signal provided to the load, as well as detailed description of other signals that interact to control the shape, timing, and amplitude of the output signal, will be provided later below with respect to FIGS. 2 and 4.

From time t0 to t1 during the inactive portion of the duty cycle in FIG. 1A, the output signal 100 is OFF or LOW, thereby providing no current or a small bias current to the load (e.g., one or more LEDs).

At time t1, the output signal 100 provided to the load transitions from OFF or LOW to ON or HIGH (e.g., transitions to the active portion of the duty cycle). In one embodiment, the transitioning from OFF or LOW to ON or HIGH at the time t1 provides a current amplitude lx for the output signal 100 that is less than a commanded current amplitude lcmd of the output signal 100. The value of lx can be any suitable value less than lcmd.

From time t1 to t2, the linear power supply is activated to supply the output signal 100 (e.g., current) to the load. In one embodiment, the amplitude lx of the current supplied by the linear power supply during time t1 to t2 is ⅔ of the commanded current that is drawn by the load, although other fractions of the commanded current may be used.

The duration from t1 to t2 can be of any suitable duration to provide a delay between the application of the linear power supply and the application of the switching power supply. An example duration is 100 microseconds, for example. It is appreciated that the specific duration of time t1 to t2 to apply the linear power supply can vary from one embodiment to another, depending on factors such as intensity output, desired efficiency, load characteristics, linear power supply characteristics, circuit characteristics, desired load behavior, and so forth.

At time t2, after expiration of the delay, the output signal 100 into the load completes its transition to its commanded ON or HIGH level corresponding to the current amplitude lcmd. At time t2, the linear power supply is deactivated, and the switching power supply is activated to supply current to the load at nominally at the commanded current level for the load.

From time t2 to t3, the switching power supply continues to supply current to the load, in its high-efficiency switching mode. At time t3, the output signal 100 transitions from ON or HIGH to OFF or LOW, thereby stopping the supply of current provided by the switching power supply to the load.

The output signal 100 remains OFF or LOW until time t4, wherein the process repeats as explained above beginning at time t1.

Depending on the required duty cycle, the first duration corresponding to the delay from time t1 to t2 (when current is provided to the load by the linear power supply) can be shorter than, longer than, or the same as a second duration from time t2 to t3 (when current is provided to the load by the switching power supply).

As will be described later below with respect to FIG. 4, a PWM enable signal 401 is used by an embodiment to control activation and deactivation of the linear and switched power supplies that together provide the output signal 100, as PWM is the primary and most common method used to achieve LED dimming. Furthermore, since LED life, color, and device-to-device luminance are adversely affected at low or excessively high LED current levels, PWM is advantageous in that current with amplitude between acceptable limits is guaranteed to be supplied to the load (e.g., to one or more LEDs) when the PWM enable signal 401 is ON or HIGH.

The lower limit of the PWM enable signal's 401 "pulse rate" can be set based on the human eye's peripheral vision response time and the human brain's perception of flicker. That is, the pulse rate (frequency of turning ON and OFF) by the PWM enable signal 401 can be set such that the human eye/brain does not detect "flicker" when the load such as LEDs are sequentially activated and deactivated. Flicker problems are sometimes compounded, particularly on larger displays, when the backlight provided by the LED is coupled with an active matrix liquid crystal display (AMLCD) that refreshes its image at a rate of 50 Hz or 60 Hz. The "beating" between backlight PWM-enabled LED(s) and AMLCD refresh can appear as a flicker or vertically scrolling bars to the human eye/brain. From empirical testing, the minimum acceptable PWM signal frequency to minimize perceived flicker in such situations is about 160 Hz, as depicted in FIG. 1A.

In one embodiment, the duty cycle of the output signal 100 is adjustable by making adjustments to the PWM enable signal 401. For instance, narrower duty cycles (e.g., shorter ON or HIGH times during each 160 Hz cycle) can be provided for the output signal 100 when low luminance is desired. For the sake of illustration, the output signal 100 is depicted as having a duty cycle of approximately 60%. It is also appreciated that the 160 Hz frequency of the output signal 100 is also illustrative and not meant to be limiting.

FIG. 1B shows in further detail the output signal 100 supplied to the load during the times corresponding to times t0-t3 as described above with respect to FIG. 1A (but of different time scale). In one embodiment, the output signal 100 supplied to the load has the same lcmd and lx amplitude values as the amplitudes of the command signals (explained later below with respect to FIG. 4) that are generated in response to the PWM enable signal 401 to control activation/deactivation of the linear and switching power supplies, although such current amplitude values need not necessarily be similar or of the same magnitude in other embodiments.

Again, from time t0 to t1 in FIG. 1B when the PWM enable signal 401 is OFF or LOW, the output signal 100 is also OFF or LOW, so that no (or a minimal bias level) current is supplied to the load, thereby resulting in no (or minimal) light output from the LED(s).

At time t1, the PWM enable signal 401 is ON or HIGH, thereby resulting in activation of the linear power supply to supply (after a short rise time) the output signal 100 as a constant, linear-amplitude current that has a level less than the full commanded current level. This linear-amplitude current is supplied by the linear current supply during the delay provided during time t1 to t2, as explained above.

At time t2, the enabling signal for the switching power supply transitions to its ON level, thereby deactivating the linear power supply and activating the switching power supply. The switching power supply provides the output signal 100 current to the load thereafter at times t2 to t3, nominally at the commanded current for the LED(s) in the load.

Figure 2:
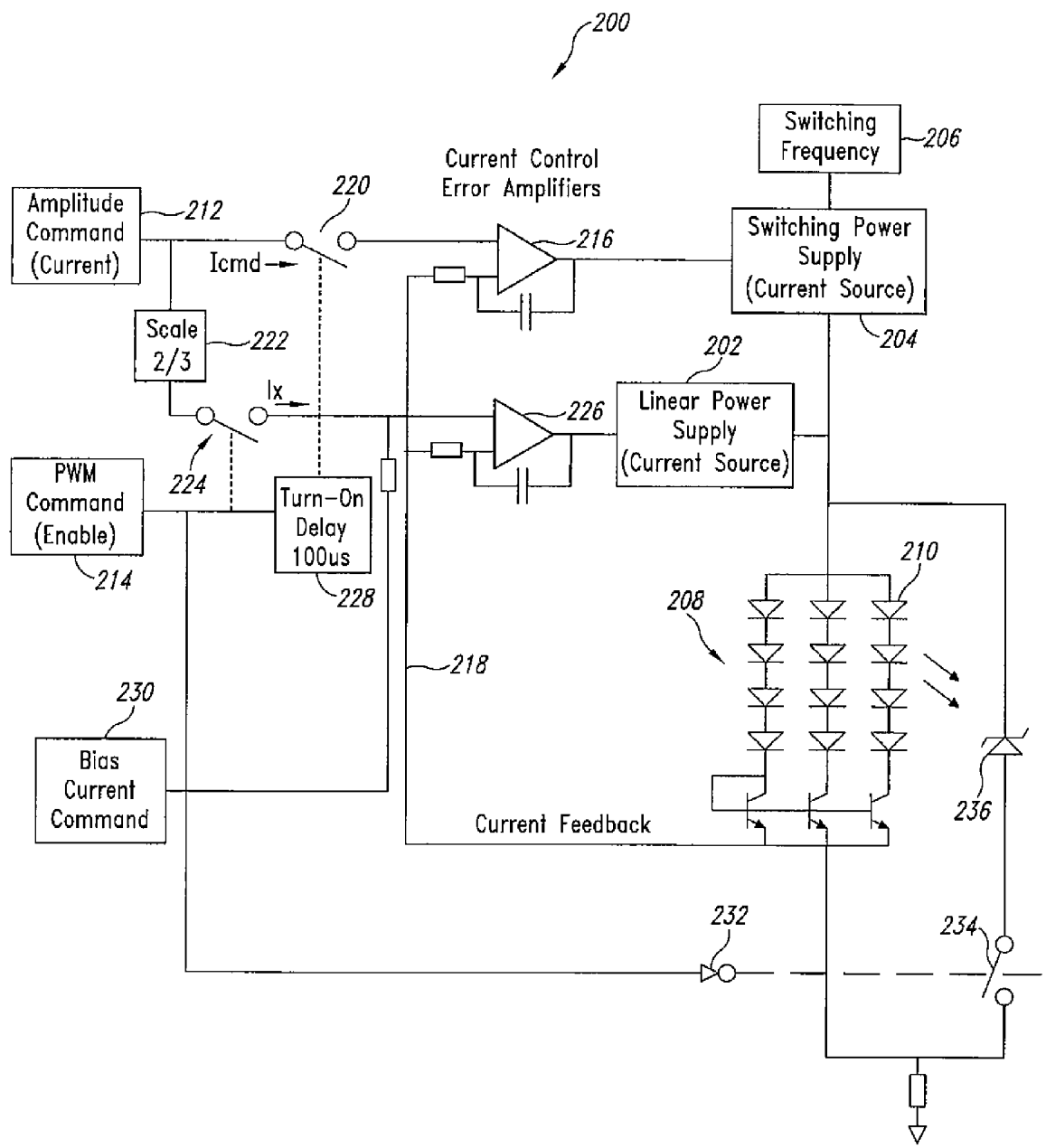
FIG. 2 is a schematic block diagram of one embodiment of an apparatus that can operate according to the graphical representations of FIGS. 1A-1B.

FIG. 2 is a schematic diagram of an apparatus 200 that provides the "hybrid" power supply capability as described above with reference to the graphical representations in FIGS. 1A-1B. The apparatus 200 includes or is coupleable to a linear power supply 202 and a switching power supply 204 (having a switching frequency that can be set or otherwise controlled by a unit 206, thereby providing output current pulses at a frequency corresponding to the switching frequency). The linear power supply 202 and the switching power supply 204 are current sources in an embodiment. Output terminals of the linear power supply 202 and the switching power supply 204 are in turn coupled to a first terminal of a load 208. A second terminal of the load 208 is coupled to ground.

In one embodiment, the load 208 includes at least one LED 210 for a backlight display device. In another embodiment, the load 208 includes at least one LED of a given color as part of a plurality of power supplies with different discrete colors for a backlight display device. In other embodiments, the load 208 can comprise other types of loads, including illumination and non-illumination loads, a laser device, a microwave device, that are not necessarily associated with a display device and which do not necessarily include LEDs.

The apparatus 200 includes an amplitude command unit 212 having an output terminal to supply a linear command signal and a switching command signal to respectively control activation of the linear power supply 202 and the switching power supply 204. The output terminal of the amplitude command unit 212 is coupled to first switch 220, which is in turn coupled to a first input terminal of a switching power supply error amplifier 216 (e.g., a current control error amplifier or other control unit). The switching power supply error amplifier 216 in turn has an output terminal coupled to a control terminal of the switching power supply 204, thereby allowing output current of the switching power supply 204 to be increased or decreased based on the switching command signal at its control terminal. The switching power supply error amplifier 216 has a second input terminal coupled to receive a current feedback signal at 218 from the second terminal of the load 208.

The output terminal of the amplitude command unit 212 is also coupled to a scale unit 222, which in one embodiment scales down the output command signal from the amplitude command unit 212 to lx. In one embodiment, the scale unit 222 scales down lcmd to ⅔ of its value, although other scaling values can be provided. The scale unit 222 is coupled to a second switch 224, which is in turn coupled to a first input terminal of a linear power supply error amplifier 226 (e.g., another current control error amplifier or other control unit). The linear power supply error amplifier 226 in turn has an output terminal coupled to a control terminal of the linear power supply 202, thereby allowing output current of the linear power supply 202 to be increased or decreased based on the linear command signal at its control terminal. The linear power supply error amplifier 226 has a second input terminal coupled to receive the current feedback signal at 218 from the second terminal of the load 208.

The apparatus 200 includes a PWM command unit 214 that generates the PWM enable signal 401 (described with respect to FIG. 4) at its output terminal. In one embodiment, the amplitude command unit 212 and the PWM command unit 214 can collectively comprise part of a PWM subsystem. The PWM enable signal 401 allows the PWM command unit 214 to control actuation of the second switch 224, such as to close the second switch 224 during the initial part of the ON duty cycle of the PWM enable signal 401 to supply the current to the load 208. The PWM command unit 214 has its output terminal coupled to a turn on delay unit 228 to generate switching PWM enable signal 402, control actuation of the first switch 220, and to initiate activation of the switching power supply 204. In one embodiment described above with respect to FIG. 1, the delay provided by the turn on delay unit 228 is 100 microseconds, which is understood to be merely illustrative.

In an embodiment, the linear and switching amplitude command and the PWM duty cycle command for each color of LED power supply in the backlight are set by an outer control loop that operates to regulate luminance and color.

The embodiment(s) of the apparatus 200 described above sufficiently addresses the disadvantages/problems of existing methods/circuits for driving backlit displays. Another embodiment provides further advantages by using a biasing feature to achieve a very fast turn ON. This biasing feature becomes useful at fast refresh rates (e.g., 160 Hz) and very low light levels (e.g., short pulses) due to the slow turn ON rate of the linear power supply when transitioning from a completely OFF state.

Specifically, an embodiment of the apparatus 200 of FIG. 2 described above can include optional bias circuitry, which is also shown in FIG. 2. The bias circuitry of one embodiment includes a bias current command unit 230 coupled to the first input terminal of the linear power supply error amplifier 226 to provide a bias current command. Said bias current command can be provided to the load 208 in one embodiment as a bias current supplied by the linear power supply 202.

A voltage clamping element (such as a zener diode 236 in one embodiment) is coupled in series with a third switch 234. The zener diode 236 and the third switch 234 are coupled in parallel to the load 208. An inverter 232 has an input terminal coupled to the output terminal of the PWM command unit 214 to receive the PWM enable signal 401 and to invert it. The inverter 232 has an output terminal coupled to the third switch 234 so that the inverted PWM enable 401 is used to control activation/deactivation of the third switch 234.

Specifically, the third switch 234 is opened during the ON portion of the duty cycle of the PWM enable signal 401 to disable the zener diode 236 and thus decouple the zener diode 236 from the load 208. The third switch 234 is closed during the OFF portion of the duty cycle of the PWM enable signal 401 to enable the zener diode 236 to clamp the forward voltage of the LED(s) 210 to just below turn ON voltage. In this manner, the bias current command from the bias current command unit 230 is provided to the linear power supply error amplifier 226 during the OFF portion of the duty cycle of the PWM enable signal 401. The bias current command causes the linear power supply 202 to supply an output current and voltage insufficient to cause illumination due to the voltage clamping of zener diode 236, but allows faster response to drive current changes.

Operation of an embodiment of the apparatus 200 that uses the bias circuitry will now be described with reference to both FIGS. 2 and 4. In particular, FIG. 4 provides graphical representations of the operation of a method and apparatus according to one embodiment that uses the bias circuitry, although it is understood that the operation of a method and apparatus that does not use the bias circuitry can also be ascertained from the graphical representations of FIG. 4. Again and as previously explained above, the graphical representations are merely for illustrative purposes for ease of explanation and understanding, and not necessarily drawn to scale and are also not intended to precisely depict the shape of waveforms.

Figure 4:
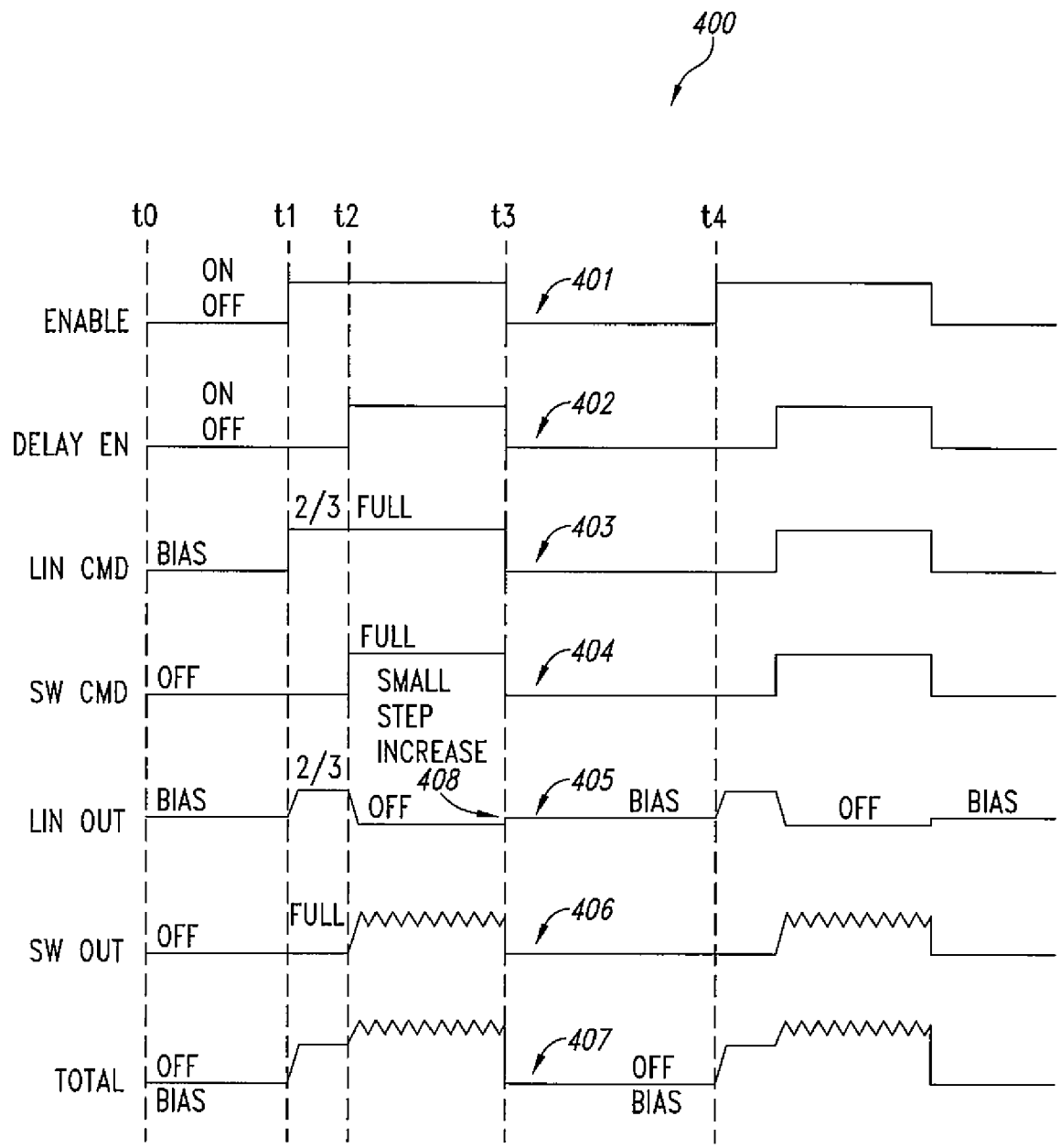
FIG. 4 is a timing diagram associated with one embodiment of a method that can be performed by the apparatus of FIG. 2.

FIG. 4 depicts a set 400 of waveforms/signals 401-407 that represent the relative timing between different aspects that control activation of the linear power supply 202 and the switching power supply 204 and the resulting drive current 407 (represented by the output signal 100 in FIGS. 1A-1B), which is the sum of the linear output signal 405 and the switching output signal 406, supplied to the load 208.

The PWM enable signal 401 is shown having a duty cycle with ON and OFF portions. From time t0 to t1 during the inactive portion of the duty cycle, the PWM enable signal 401 is OFF or LOW, thereby providing no enable signal to close the switches 220 and 224, which results in the linear and switching power supplies 202 and 204 providing minimal or no power to the load. In an embodiment that includes the bias circuitry, the bias current command unit 230 provides a bias current and voltage to the load 208 during this OFF portion of the duty cycle of the PWM enable signal 401.

At the beginning of the ON part of the duty cycle (e.g., at time t1) of the PWM enable signal 401, the second switch 224 is closed by the PWM enable signal 401, and the output of the amplitude command unit 212 is scaled down (Ix=⅔ in this case) by the scale unit 222, thereby resulting in the linear command signal 403 of FIG. 4. The resulting scaled-down linear command signal 403 from the scale unit 222 is passed to the linear power supply error amplifier 226 at its first input terminal. The linear power supply error amplifier 226 senses a difference between the scaled-down linear command signal 403 and the level of current at 218 from the load 208, and quickly slews or otherwise controls the linear power supply 202 to supply current (shown as the linear output signal 405) to the load 208 during time t1 to t2 (after the initial rise time) at a level less that the commanded current level, such as Ix=⅔ of the current commanded for the load 208. It is noted that at any time, the linear power supply 202 can be turned OFF to give fine resolution dimming control.

At time t2, the switching PWM enable signal 402 transitions to its full ON or HIGH level, thereby deactivating the linear power supply 202 and activating the switching power supply 204. Specifically in one example embodiment, after a delay (100 microseconds in this case) provided by the turn on delay unit 228 from time t1 to t2, the first switch 220 is closed by the switching PWM enable signal 402 from the turn on delay unit 228, and the full amplitude Icmd of the switching command signal 404 is provided by the amplitude command unit 212 to the switching power supply error amplifier 216 at its first input terminal. The switching power supply error amplifier 216 then senses that the feedback current at 218, received at its second input terminal from the load 208, is below the target level (e.g., below the amplitude of the switching command signal at its first input), and ramps up or otherwise activates the switching power supply 204 at time t2 to provide current (shown as the switching output signal 406) to the load 208 at the commanded level.

Also at time t2, the linear power supply error amplifier 226, sensing the increased current at 218 at its second input terminal, which is now greater than the ⅔ scaled-down linear command signal 403 at its first input terminal, then turns OFF the linear power supply 202 to turn OFF the linear output signal 405 to the load 208. Thus, the apparatus 200 enters the high-efficiency switching mode in which the switching power supply 204 provides switched output signal 406 to the load 208 from time t2 to t3.

At time t3, the PWM command unit 214 switches OFF the PWM enable signal 401, thereby causing the switches 220 and 224 to open, and waits for the next 160 Hz period to start a new cycle at time t4. The bias current is at that time also provided again to the load 208, as shown as a small step increase 408 in the linear output signal 405 from the linear power supply 202. The process described above then repeats at the next positive (ON) portion of the duty cycle of the PWM enable signal 401.

Figure 3:
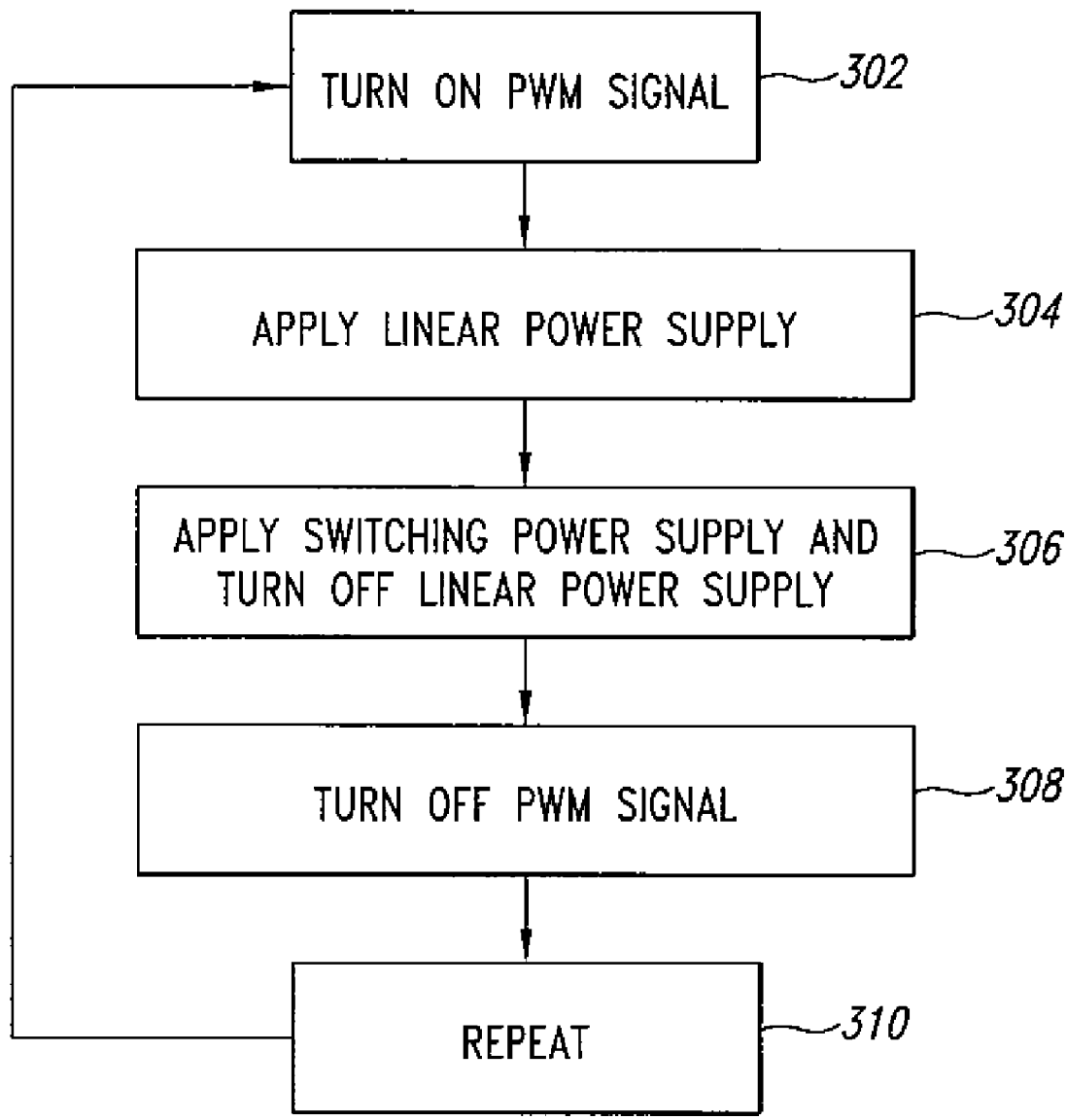
FIG. 3 is a flowchart of one embodiment of a method that can be performed by the apparatus of FIG. 2.

FIG. 3 is a flowchart of an embodiment of a method 300 corresponding to FIGS. 1-2 and 4 to provide a hybrid power supply to the load 208. The apparatus 200 of one embodiment can perform the operations depicted by the method 300. Alternatively or additionally in another embodiment, at least some of the depicted operations (and/or acts to initiate or control said operations or portions thereof) can be implemented by software or other machine-readable instruction stored on a machine-readable medium and executable by a processor.

It is appreciated that the operations in the method 300 need not necessarily occur in the exact order shown. Moreover, certain operations can be added, removed, modified, and/or combined.

At a block 302, the PWM enable signal 401 transitions from OFF to ON of the positive portion of the duty cycle. At the beginning part of this ON portion of the duty cycle, the linear power supply 202 is activated, as explained above, at a block 304 to supply (after an initial rise time) a current of constant linear amplitude to the load 208. In one embodiment, such as described above, the supplied current (e.g., the linear output signal 405) is less than the full commanded current that can be drawn by the load 208, such as ⅔ of the commanded current. In one embodiment that provides the bias circuitry, the bias circuitry is turned OFF at the beginning of the block 304.

At a block 306 and subsequent to expiration of a delay in which the linear power supply 202 is supplying current to the load 208, the switching power supply 204 is activated to supply current (e.g., the output signal 406) to the load 208 during the remaining ON portion of the duty cycle of the PWM enable signal 401. The linear power supply 202 is turned OFF at the block 306. At a block 308, the PWM enable signal 401 transitions to its OFF level, thereby turning OFF the switching power supply 204 until the next ON portion of the duty cycle of the PWM enable signal 401 and also causing the bias current and voltage to be provided to the load 208 for embodiments that use the bias circuitry. The method repeats as described above for blocks 302-308, at a block 310.

Accordingly from the embodiments described above, it is apparent that the linear power supply 202 can operate for a short time, thus reducing its impact on system efficiency and component size. The switching power supply 204 turns on after a delay and provides discrete pulses that are small in comparison to the total PWM ON time.

In an embodiment, higher efficiency (such as approximately 90% efficiency, for example) resulting from the hybrid combination of power supplies provides certain advantages. Such advantages include, but are not limited to, reduction of load on the power supplies 202 and 204 and on the overall system, reduction in temperature of surrounding components to help improve reliability and life, and reduction in weight and size of cooling components (e.g., heat sinks and fans).

Other advantages provided by one or more embodiments are:

160 Hz frequency of the PWM signal, thereby reducing flicker;

Accurate current amplitude control (stable and consistent cycle-to-cycle);

Fast minimum pulse ON time/width (e.g., 8 microseconds max);

Fast rise/fall time (e.g., 1 microsecond max); and

Fast time step resolution (e.g., 500 nanoseconds max).

The above description of illustrated embodiments, including what is described in the Abstract, is not intended to be exhaustive or to limit the invention to the precise forms disclosed. While specific embodiments and examples are described herein for illustrative purposes, various equivalent modifications are possible and can be made without deviating from the spirit and scope of the invention.

For example, certain specific values have been provided above for frequency, duration, amplitude, etc. of the various signals. It is appreciated that such specific values are provided only for the sake of illustration and explanation, and that other embodiments can implement different values.

As another example, an embodiment can provide current to the load 208 by way of the linear power supply 202 only, without using the switching power supply 204 during the active ON portion of the duty cycle of the PWM signal. In such an embodiment, the active ON portion of the duty cycle may be of narrow (short) length for low luminance conditions, thereby removing the need to use the switching power supply 204.

These and other modifications can be made in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method to provide power to a load, the method comprising:
generating a PWM enable signal that has a duty cycle that includes a first portion and a second portion;
during an initial part of said first portion, supplying current to said load from a linear power supply to cause said load to generate light;
during a remainder part of said first portion that is subsequent to said initial part of said first portion, deactivating said linear power supply and supplying a current to said load from a switching power supply to cause said load to continue to generate light; and
deactivating said switching power supply during said second portion of said duty cycle.

2. The method of claim 1 wherein supplying said current from said linear power supply and said current from said switched power supply to said load includes supplying said currents to at least one light emitting diode (LED) of a backlight display.

3. The method of claim 1 wherein supplying said current to said load from the linear power supply during the initial part of the first portion includes supplying the current from the linear power supply at a scaled current value less than a commanded current value for said load, and wherein supplying said current to said load from the switching power supply includes supplying said current from the switching power supply nominally at said commanded current value.

4. The method of claim 3, further comprising:
obtaining a first feedback current value from said load;
comparing the obtained first feedback current value with said scaled current value of said current from the linear power supply, and providing said current having said scaled current value from the linear power supply to said load;
obtaining a second feedback current value from said load; and
comparing the obtained second feedback current value with said commanded current value, and deactivating the linear power supply and providing said current from said switching power supply nominally at said commanded current value to said load.

5. The method of claim 1 wherein deactivating said linear power supply and supplying current from said switching power supply to said load is performed after expiration of a delay, wherein a command signal to activate said switching power supply is provided to said switching power supply after expiration of said delay.

6. The method of claim 1, further comprising adjusting said duty cycle, wherein only said linear power supply is used to provide said current to said load during an adjusted duty cycle having an adjusted first portion substantially shorter in duration relative to an adjusted second portion.

7. The method of claim 1 wherein said remainder part of said first portion is longer in duration than said initial part of said first portion.

8. The method of claim 1, further comprising providing a bias current and voltage to said load during the second portion wherein said bias current and voltage does not cause said load to generate light, by clamping said bias voltage below a turn-ON voltage of said load.

9. The method of claim 8 wherein clamping said bias voltage below the turn ON voltage of said load includes using a zener diode to clamp the bias voltage below a turn ON voltage of an LED.

10. An apparatus to provide power to a load, the apparatus comprising:
a pulse wave modulation (PWM) subsystem to generate a PWM enable signal that has a duty cycle that includes a first portion and a second portion;
a first control unit coupled to said PWM subsystem to control a linear power supply to supply current to said load to cause said load to generate light during an initial part of said first portion; and
a second control unit coupled to said PWM subsystem to control a switching power supply to supply a current to said load to cause said load to continue to generate light during a remainder part of said first portion that is subsequent to said initial part of said first portion, said first control unit being adapted to deactivate said linear power supply during said remainder part of said first portion, said second control unit being adapted to deactivate said switching power supply during said second portion of said duty cycle.

11. The apparatus of claim 10 wherein said load includes at least one light emitting diode (LED) of a backlight display.

12. The apparatus of claim 10 wherein said first control unit is a first error amplifier having:

a first input terminal coupled to said PWM subsystem to receive a switching command signal provided in response to expiration of a delay of said PWM enable signal, said switching command signal being nominally at a commanded current value for said load;
a second input terminal coupled to said load to receive a feedback current value from said load; and
an output terminal coupled to a control terminal of said switching power supply to control said switching power supply to generate the current supplied during the remainder part of the first portion and having a nominal amplitude corresponding to the commanded current value, if said first error amplifier determines that said feedback current value is different than said switching command signal nominally at the commanded current value.

13. The apparatus of claim 10 wherein said second control unit is a second error amplifier having:
a first input terminal coupled to said PWM subsystem to receive a linear command signal in response to transition to said first portion of said duty cycle of said PWM enable signal, said linear command signal being at a scaled value less than a commanded current value for said load;
a second input terminal coupled to said load to receive a feedback current value from said load; and
an output terminal coupled to a control terminal of said linear power supply to control said linear power supply to generate the current, having an amplitude less than the commanded current value, if said second error amplifier determines that said feedback current value is different than said linear command signal at the scaled value, and to deactivate said linear power supply if said second error amplifier determines that said feedback current value is greater than said linear command signal at the scaled value.

14. The apparatus of claim 10 wherein said PWM subsystem includes:
an amplitude command unit to generate a linear command signal and a switching command signal;
a PWM command unit to generate said PWM enable signal, the apparatus further comprising:
a first switch coupled between said amplitude command unit and said second control unit, said first switch being actuable in response to said PWM enable signal;
a scale unit coupled to an output terminal of said amplitude command unit to scale down said linear command signal;
a second switch coupled between said scale unit and said first control unit, said second switch being actuable in response to said PWM enable signal; and
a turn on delay unit coupled to an output terminal of said PWM command unit to receive said PWM enable signal and to provide a delay, wherein said scale unit is adapted to provide said scaled down linear command signal to said first control unit in response to actuation of said second switch by the PWM enable signal and wherein said turn on delay unit is adapted to provide said PWM enable signal to said first switch after expiration of said delay so as to actuate said first switch to cause said amplitude command unit to provide said switching command signal, un-scaled, to said second control unit.

15. The apparatus of claim 10, further comprising:
a bias current command unit coupled to said first control unit to provide a bias current and voltage to said load during the second portion; and a clamping zener diode coupled to said load to prevent said bias voltage from causing said load to generate light during the second portion.

16. A system, comprising:

a backlight light emitting diode (LED) display device;

a linear power supply coupled to said LED display device;

a switching power supply coupled to said LED display device;

a pulse wave modulation (PWM) subsystem to generate a PWM enable signal that has a duty cycle that includes an ON portion and an OFF portion;

a first control unit coupled to said PWM subsystem to control said linear power supply to supply current to said LED display device during an initial part of said ON portion of the duty cycle; and a second control unit coupled to said PWM subsystem to control said switching power supply to supply a current to said LED display device during a remainder part of said ON portion that is subsequent to said initial part of said ON portion, said first control unit being adapted to deactivate said linear power supply during said remainder part of said ON portion, said second control unit being adapted to deactivate said switching power supply during said OFF portion of said duty cycle.

17. The system of claim 16 wherein the LED display device includes a plurality of LEDs and power supplies that generate different colors, said currents from the linear and switching power supplies being provided at levels to maintain consistency of color of said display device.

18. The system of claim 16 wherein said PWM subsystem includes:

an amplitude command unit to generate a linear command signal and a switching command signal;

a PWM command unit to generate said PWM enable signal, the system further comprising:

a first switch coupled between said amplitude command unit and said second control unit, said first switch being actuable in response to said PWM enable signal;

a scale unit coupled to an output terminal of said amplitude command unit to scale down said linear command signal;

a second switch coupled between said scale unit and said first current unit, said second switch being actuable in response to said PWM enable signal; and a turn on delay unit coupled to an output terminal of said PWM command unit to receive said PWM enable signal and to provide a delay, wherein said scale unit is adapted to provide said scaled down linear command signal to said first control unit in response to actuation of said second switch by the PWM enable signal and wherein said turn on delay unit is adapted to provide said PWM enable signal to said first switch after expiration of said delay so as to actuate said first switch to cause said amplitude command unit to provide said switching command signal, un-scaled, to said second control unit.

19. The system of claim 16 wherein said first and second control units include current control error amplifiers responsive to a feedback current from said LED display device to determine whether to turn ON or turn OFF said linear and switching power supplies.

20. The system of claim 16, further comprising:

a bias current command unit coupled to said first control unit to provide a bias current and voltage to said load during the OFF portion; and a clamping zener diode coupled to said load to prevent said bias voltage from causing said load to generate light during the OFF portion.

21. A method to provide power to loads, the method comprising:

producing a drive signal indicative of an amplitude;

scaling down the drive signal to produce a scaled down drive signal;

applying the scaled down drive signal to a linear power supply error circuit at a first time;

producing a linear power supply error signal indicative of a difference between the scaled down drive signal and a current feedback signal indicative of a magnitude of a current being supplied to a load;

applying the linear power supply error signal to drive a linear power supply to supply current to the load;

applying the drive signal to a switching power supply error circuit at a second time, the second time delayed from the first time;

producing a switching power supply error signal indicative of a difference between the drive signal and the current feed back signal indicative of the magnitude of the current being supplied to the load; and applying the switching power supply error signal to drive a switching power supply to supply current to the load.

22. The method of claim 21, further comprising:

supplying a pulse width modulated enable signal to selectively control application of the scaled drive signal to the linear power supply error circuit at the first time and to selectively control application of the drive signal to the drive signal to a switching power supply error circuit at the second time.

23. The method of claim 22, further comprising:

from time to time, adjusting a duty cycle of the pulse width modulated signal.

24. The method of claim 21 wherein supplying a pulse width modulated signal to selectively control application of the scaled drive signal to the linear power supply error circuit at the first time includes supplying the pulse width modulated signal to a first switch to couple a scale unit to the linear power supply error circuit.

25. The method of claim 24 wherein supplying a pulse width modulated signal to selectively control application of the drive signal to a switching power supply error circuit at the second time includes supplying the pulse width modulated signal to a second switch via a turn on delay unit to couple the drive signal to the switching power supply error circuit.

26. The method of claim 21, further comprising providing a bias current and voltage to said load during a third time when said switching power supply does not supply said current to the load, wherein said bias voltage does not cause said load to generate light, by clamping said bias voltage below a turn-ON voltage of said load.

* * * * *